United States Patent
Ter Keurs et al.

(10) Patent No.: US 10,807,707 B1
(45) Date of Patent: Oct. 20, 2020

(54) VERTICAL TAKE-OFF AND LANDING (VTOL) AIRCRAFT HAVING VARIABLE CENTER OF GRAVITY

(71) Applicant: Draganfly Innovations Inc., Saskatoon (CA)

(72) Inventors: Mark Ter Keurs, Surrey (CA); Garry Reusch, Calgary (CA)

(73) Assignee: DRAGANFLY INNOVATIONS INC., Saskatoon (CA)

( * ) Notice: Subject to any disclaimer, the term of this patent is extended or adjusted under 35 U.S.C. 154(b) by 140 days.

(21) Appl. No.: 15/706,158

(22) Filed: Sep. 15, 2017

Related U.S. Application Data

(60) Provisional application No. 62/395,211, filed on Sep. 15, 2016.

(51) Int. Cl.
*B64C 29/00* (2006.01)
*B64C 39/02* (2006.01)
(Continued)

(52) U.S. Cl.
CPC .......... *B64C 29/0033* (2013.01); *B64C 25/52* (2013.01); *B64C 39/024* (2013.01); *B64D 9/00* (2013.01); *B64D 45/04* (2013.01); *B64C 2201/021* (2013.01); *B64C 2201/024* (2013.01); *B64C 2201/088* (2013.01);
(Continued)

(58) Field of Classification Search
CPC ... B64C 29/0033; B64C 25/52; B64C 39/024; B64C 2201/021; B64C 2201/165; B64C 2201/108; B64C 2201/102; B64C 2201/024; B64C 2201/088; B64D 45/04; B64D 9/00

See application file for complete search history.

(56) References Cited

U.S. PATENT DOCUMENTS

| 3,083,936 A | 4/1963 | Rethorst |
| 3,857,534 A * | 12/1974 | Drees .................... B64C 27/001 244/17.27 |

(Continued)

OTHER PUBLICATIONS

Muraoka et al. "Quad Tilt Wing VTOL UAV: Aerodynamic Characteristics and Prototype Flight Test", (Year: 2009).*
(Continued)

*Primary Examiner* — Assres H Woldemaryam
(74) *Attorney, Agent, or Firm* — Suiter Swantz pc llo

(57) ABSTRACT

An unmanned aircraft system (UAS) configured for both vertical take-off and landing (VTOL) and fixed-wing flight operations includes forward and aft wing assemblies mounted to the fuselage, each wing assembly including port and starboard nacelles terminating in motor-driven rotors powered by an onboard control system capable of adjusting rotor speeds. The UAS may transition between a powered-lift VTOL configuration to a winged-flight configuration by shifting its center of gravity forward, pivoting the wing assemblies from a powered-lift position perpendicular to the fuselage to a winged-flight position parallel to the fuselage. The forward rotor blades may be folded back so that the aft rotors may provide primary thrust for winged flight operations. Onboard attitude sensors may detect rotor or control failures, to which the control system responds by triggering a conversion to the winged-flight configuration for recovery operations.

12 Claims, 8 Drawing Sheets

(51) Int. Cl.
*B64D 9/00* (2006.01)
*B64C 25/52* (2006.01)
*B64D 45/04* (2006.01)

(52) U.S. Cl.
CPC .. *B64C 2201/102* (2013.01); *B64C 2201/108* (2013.01); *B64C 2201/165* (2013.01)

(56) References Cited

U.S. PATENT DOCUMENTS

| | | | | |
|---|---|---|---|---|
| 5,082,204 | A * | 1/1992 | Croston | B64C 39/066 244/126 |
| 5,890,441 | A * | 4/1999 | Swinson | B64C 29/0025 244/12.1 |
| 6,457,672 | B1 * | 10/2002 | Tai | B64C 19/02 244/130 |
| 8,936,212 | B1 * | 1/2015 | Fu | B64C 3/56 244/6 |
| 9,120,560 | B1 * | 9/2015 | Armer | B64C 29/0008 |
| 9,475,579 | B2 * | 10/2016 | Fredericks | B64C 25/52 |
| 10,252,797 | B2 * | 4/2019 | Vondrell | B64C 3/32 |
| 2002/0030142 | A1 * | 3/2002 | James | B64C 29/0025 244/194 |
| 2012/0234968 | A1 * | 9/2012 | Smith | B64C 29/0033 244/12.3 |
| 2014/0316616 | A1 * | 10/2014 | Kugelmass | G05D 1/101 701/8 |
| 2015/0266571 | A1 * | 9/2015 | Bevirt | B64D 27/24 244/7 C |
| 2015/0344134 | A1 * | 12/2015 | Cruz Ayoroa | B64C 29/0033 244/48 |
| 2016/0207625 | A1 * | 7/2016 | Judas | B64C 29/0025 |
| 2016/0229516 | A1 * | 8/2016 | Behrens | B64C 1/062 |
| 2016/0304194 | A1 * | 10/2016 | Bevirt | B64C 29/0033 |
| 2016/0376004 | A1 * | 12/2016 | Claridge | B64C 19/00 701/3 |

OTHER PUBLICATIONS

Dryden et al. "Quadcopter Design Project", (Year: 2014).*
Muraoka et al. "Transition Flight of Quad Tilt Wing VTOL UAV", (Year: 2012).*

* cited by examiner

VERTICAL TAKE-OFF AND LANDING (VTOL) AIRCRAFT HAVING VARIABLE CENTER OF GRAVITY

CROSS-REFERENCE TO RELATED APPLICATIONS

The present application claims the benefit under 35 U.S.C. § 119(e) of U.S. provisional patent application Ser. No. 62/395,211 filed Sep. 15, 2016 and entitled VERTICAL TAKE-OFF AND LANDING (VTOL) AIRCRAFT HAVING VARIABLE CENTER OF GRAVITY. Said U.S. provisional patent application 62/395,211 is herein incorporated by reference in its entirety.

BACKGROUND

Unmanned aircraft systems (UAS; also unmanned aerial vehicles (UAV)) may be designed to operate with the level-flight characteristics of conventional winged-air vehicles or with the powered-lift characteristics of multirotor helicopters (e.g., quadcopters, hexacopters, and other like multirotor craft). For example, a powered-lift configured rotorcraft may be characterized by high maneuverability and minimal take-off and landing space requirements, while a UAS configured for fixed-wing flight may allow more flexibility in onboard power sources or payload capability. However, every UAS has a center of gravity (CG), and the CG requirements are different for powered-lift and winged-flight configurations. For a UAS to maintain stable flight characteristics in both powered-lift and winged-flight configurations, and more importantly throughout an inflight transitional state between the two configurations, the center of gravity (CG) of the UAS must shift accordingly, e.g., from a position optimal for level flight to a position optimal for powered lift.

SUMMARY

Embodiments of the inventive concepts disclosed herein are directed to an unmanned aircraft system (UAS) configured for vertical take-off and landing (VTOL) and efficient inflight conversion between a VTOL configuration, employing the powered-lift flight characteristics of a multirotor vehicle, and a winged-flight configuration, employing the flight characteristics of a fixed-wing aircraft.

In a first aspect, embodiments of the inventive concepts disclosed herein are directed to a variable-configuration VTOL UAS. Forward and aft wing assemblies may be pivotably mounted to a fuselage, the wing assemblies including a nacelle mounted to each wing (forward and aft, port and starboard). Each nacelle terminates in a rotor including circumferentially spaced propeller blades which rotate to provide lift and/or thrust, depending on the configuration of the vehicle. The UAS control system may adjust the pitch speed of each rotor (e.g., the speed at which the propeller blades rotate) via forward and aft motors. The UAS may take off and land in a powered-lift configuration, transitioning to a winged-flight configuration for extended airborne operations. The control system may transition the UAS by inducing a shift in the center of gravity of the UAS, e.g., by articulating the wings and nacelles from a powered-lift position (wherein the wings and nacelles are aligned substantially perpendicular to the UAS roll axis) to a winged-flight configuration (wherein the wings and nacelles are aligned substantially parallel to the roll axis), and by retracting the forward rotor blades to a position substantially parallel to the forward nacelles. Onboard attitude sensors may monitor the rotational orientation of the UAS, initiating recovery procedures if the determined orientation is indicative of a failure of one or more UAS components.

BRIEF DESCRIPTION OF THE DRAWINGS

The invention may be better understood by those skilled in the art by reference to the accompanying figures in which.

DETAILED DESCRIPTION OF EXEMPLARY EMBODIMENTS

Broadly speaking, embodiments of the inventive concepts disclosed herein are directed to a variable-configuration VTOL UAS capable of stable in-flight transition between a powered-lift configuration and a winged-flight configuration. The VTOL UAS may transition by shifting its center of gravity, facilitating stable flight characteristics appropriate to the current configuration of the UAS. The VTOL UAS may detect control or motor failures inflight by monitoring its rotational orientation and initiate emergency landing and recovery procedures if a failure condition is detected. The variable-configuration UAS may display enhanced control authority not normally associated with a winged-flight UAS, while requiring a minimal amount of space for take-off and landing operations.

Figure 1:
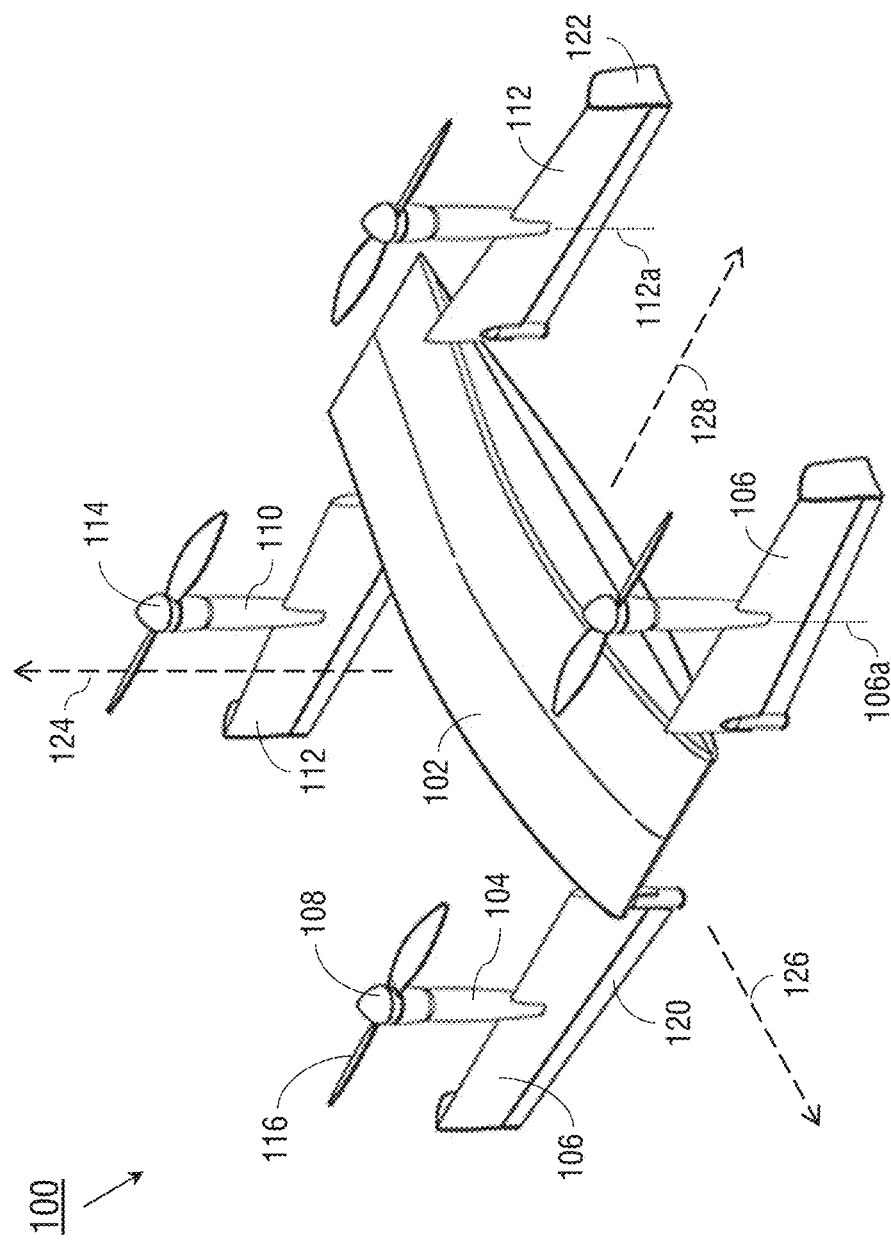
FIG. 1 is an overhead perspective view of an exemplary embodiment of a VTOL UAS in a powered-lift configuration according to the inventive concepts disclosed herein.

Referring generally to FIG. 1, an exemplary embodiment of a variable-configuration VTOL UAS 100 in a powered-lift configuration according to the inventive concepts disclosed herein may include a fuselage 102, forward nacelles 104 mounted to forward wings 106 (e.g., at the leading edges) and terminating in forward rotors 108, and aft nacelles 110 mounted to aft wings 112 and terminating in aft rotors 114. Each forward rotor 108 and aft rotor 114 may respectively include two or more evenly spaced (e.g., circumferentially spaced) rotor blades 116, 118. For example, the forward wing assembly may include forward wings 106 to the port and starboard sides, and the aft wing assembly may include aft wings 112 to the port and starboard sides; the forward wings 106 may be swept forward, and the aft wings 112 may be swept back. Each forward wing 106 and aft wing 112 may include articulable control surfaces (120) along their trailing edges and terminate in wing fences (122). The VTOL UAS 100 may, while in powered-lift configuration, orient the forward wings 106, aft wings 112, forward nacelles 104, and aft nacelles 110 substantially parallel to the direction of ascent (124; e.g., the yaw axis or z-axis of the VTOL UAS 100) and substantially perpendicular to the roll axis (126) and pitch axis (128) of the VTOL UAS, such that the forward rotors 108 and aft rotors 114 function as lift rotors, raising the VTOL UAS 100 vertically from a take-off point. The forward wings 106 and the aft wings 112 may be capable of articulation in unison by a control system of the VTOL UAS 100 around a rotational axis parallel to the pitch axis 128, as described in greater detail below.

Figure 2A:
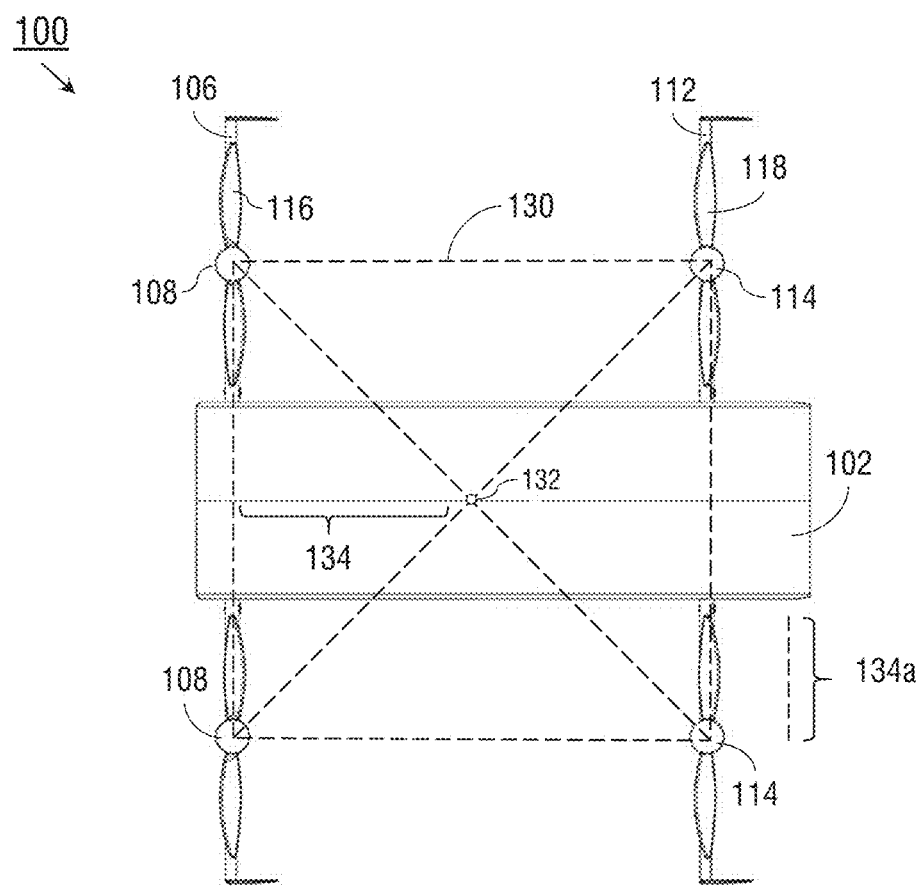
FIGS. 2A and 2B are respectively overhead and port-side profile views of the VTOL UAS of FIG. 1.
Figure 2B:
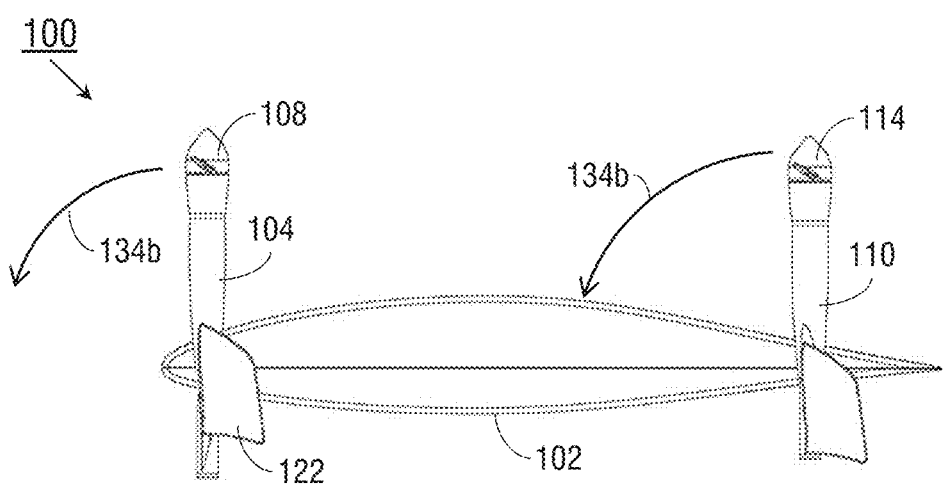

Referring now to FIGS. 2A and 2B, alternative views of the VTOL UAS 100 are shown. In transitioning the VTOL UAS 100 inflight between a powered-lift (VTOL) configuration as shown by FIG. 1 and a winged-flight configuration (as shown by, e.g., FIG. 4), the principal complication is the positioning of the center of gravity (CG) of the VTOL UAS 100, upon which stable flight performance depends. For example, with respect to powered lift, the CG of the VTOL UAS 100, as with any multirotor aircraft, must reside within the polygon (130) described by connecting the centers of lift of adjacent lift rotors (e.g., forward rotors 108 and aft rotors 114). The closer the CG to the center (132) of the polygon 130, the lower the power requirement of the most heavily loaded lift rotor, and consequently the more stable the powered-lift configuration. By contrast, the CG of a fixed-wing aircraft (emulated by the VTOL UAS 100a of, e.g., FIG. 4) must be located within the range of 5% to 30% of the mean aerodynamic chord (MAC) of the aircraft. The further forward the CG within this range, the more stable the aircraft (to a point of diminishing return with respect to induced and trim drag). Accordingly, the VTOL UAS 100 may be configured for powered lift so as to intentionally position its CG forward (134) of the optimal powered-lift CG (i.e., the center 132). Consequently, the lift power required from the forward rotors 108 may increase and the lift power required from the aft rotors 114 may decrease. For example, the forward nacelles 104 and aft nacelles 110 may be aligned with the MAC (106a, 112a; FIG. 1) of the forward wings 106 and aft wings 112, and may be respectively mounted to the leading edges of the forward and aft wings 106, 112. The forward and aft nacelles 104, 110 may incorporate motors for driving the forward and aft rotors 108, 114. The aft rotors 114 may have a pitch speed in excess of the optimal pitch speed for achieving the required lift power at minimum wattage, enabling the aft rotors to serve as thrust motors once the VTOL UAS 100 is in a winged flight configuration (see. e.g., FIG. 4). In addition, the forward position (134) of the CG may reduce the distance by which the CG of the VTOL UAS 100 must shift forward for optimally stable fixed-wing flight, e.g., by articulating (134b, FIG. 2B) the forward and aft wings 106, 110 (along with the forward and aft nacelles 104, 110 and the forward and aft rotors 108, 114) to achieve the winged-flight configuration shown by FIG. 4.

Referring in particular to FIG. 2B, the fuselage 102 may function as a low aspect ratio wing. While this layout may be classically avoided due to the poor lift to drag (L/D) ratio associated therewith, the wing fences 122 may assist the forward and aft wings (106, 112; FIG. 2A) in substantially increasing the overall L/D of the fuselage 102, providing for high lifting power at low drag.

Figure 3:
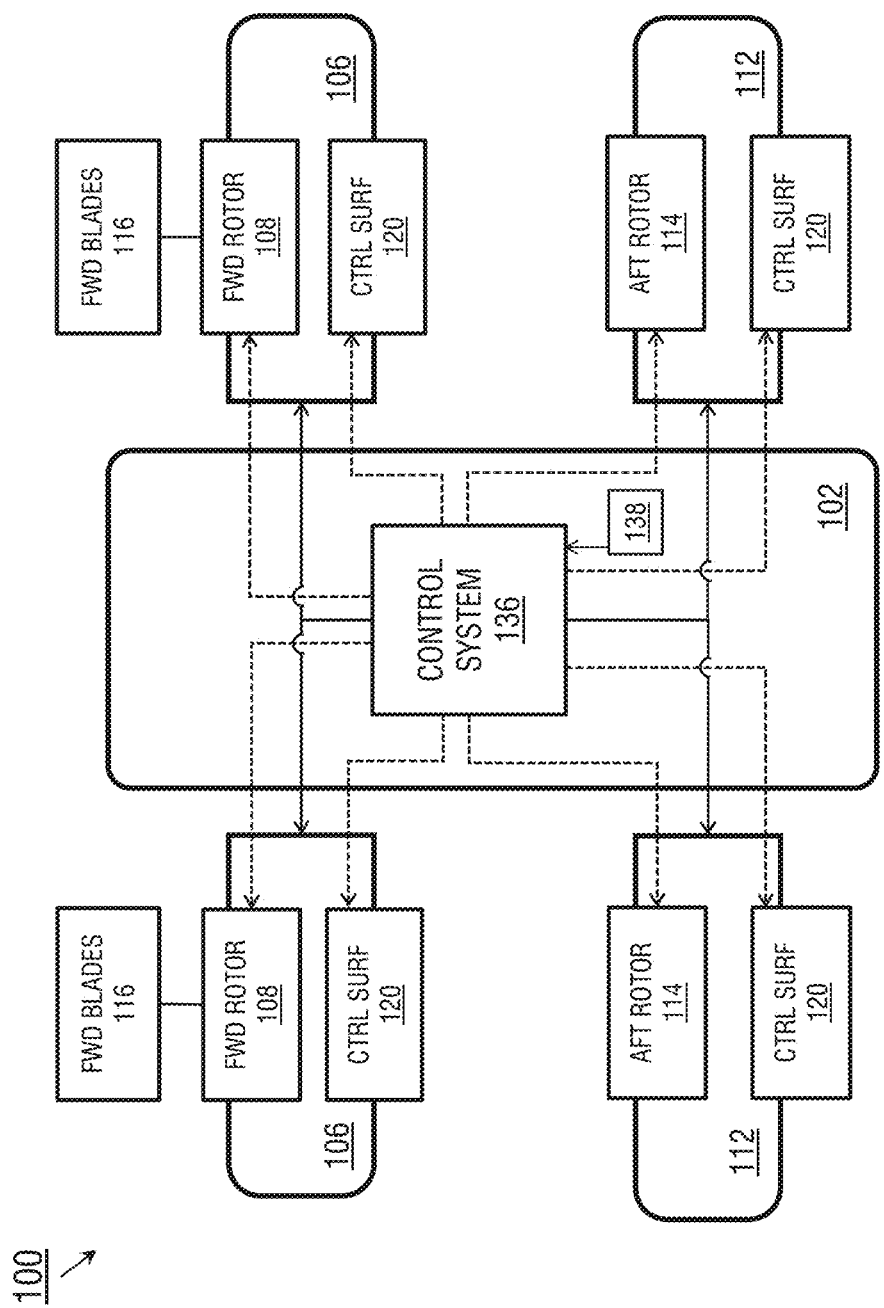
FIG. 3 is a block diagram illustrating components of the VTOL UAS of FIG. 1.
Figure 4:
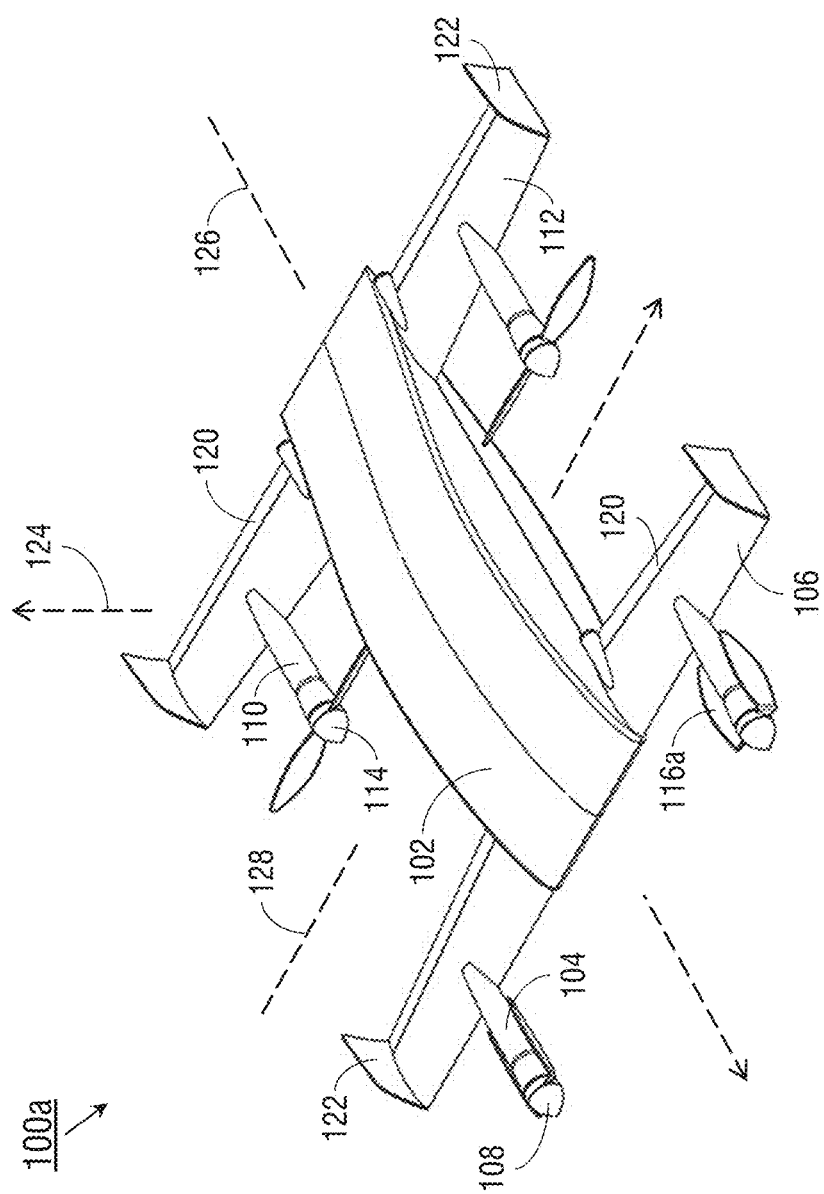
FIG. 4 is an overhead perspective view of the VTOL UAS of FIG. 1 in a winged-flight configuration.
Figure 6A:
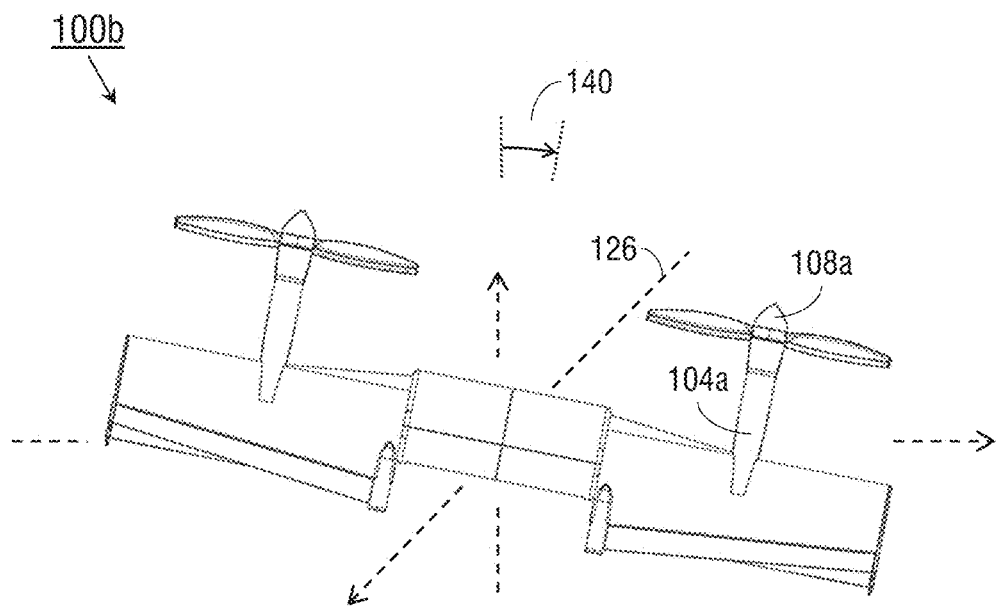
FIGS. 6A and 6B are forward views of failure detection and recovery operations of the VTOL UAS of FIG. 1.
Figure 6B:
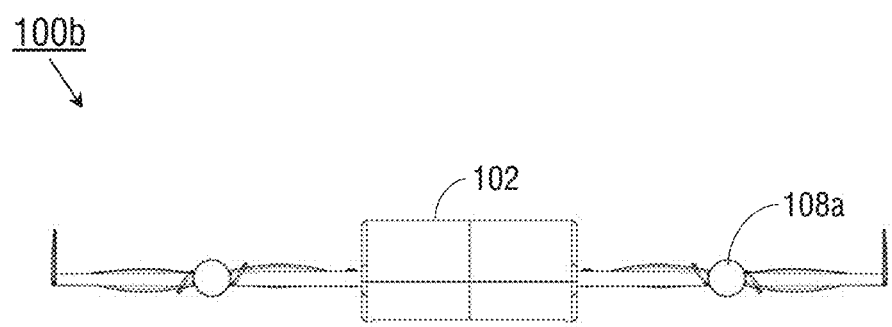
Figure 7A:
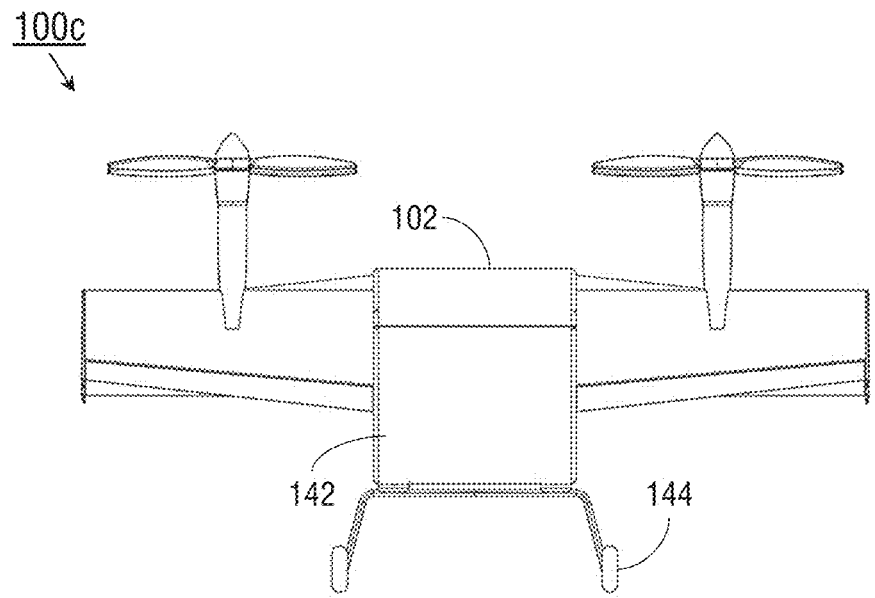
FIGS. 7A and 7B are respectively forward and port-side profile views of an exemplary embodiment of a VTOL UAS including cargo compartments and landing skids in a powered-lift configuration according to the inventive concepts disclosed herein.
Figure 7B:
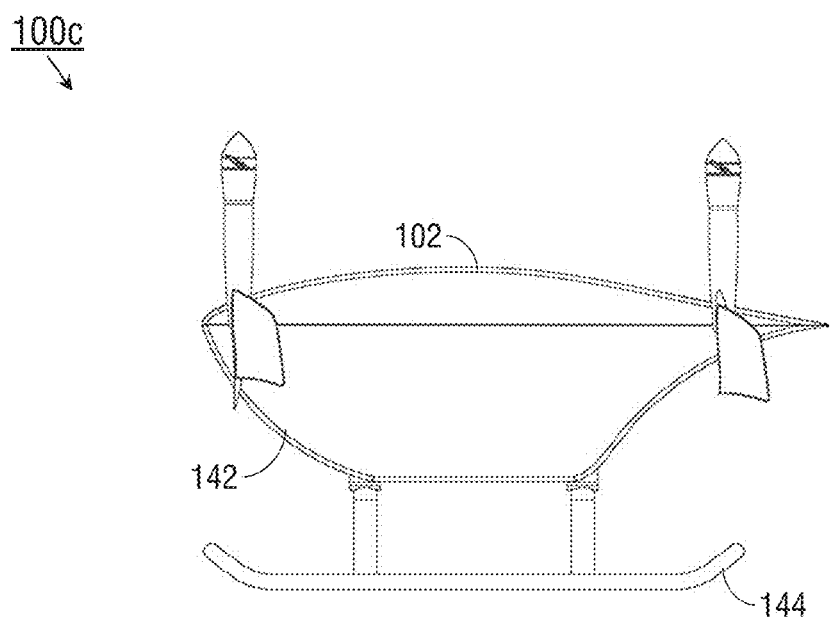
Figure 7C:
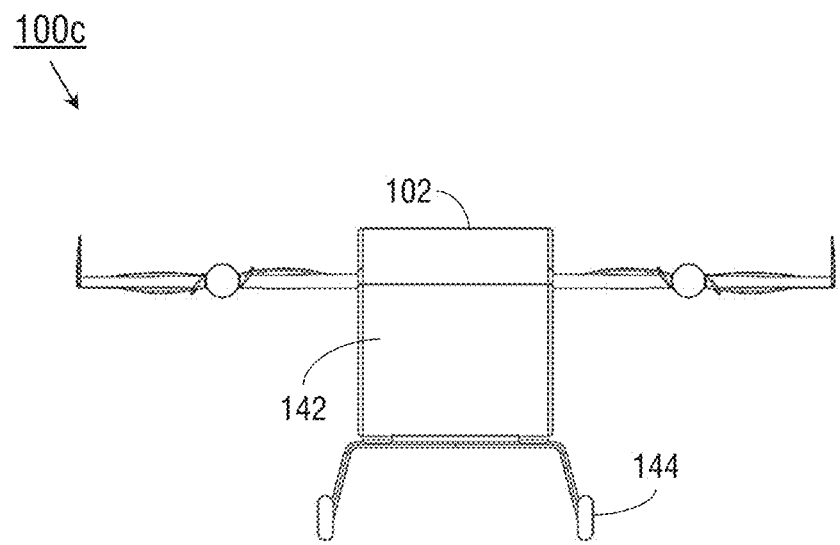
FIGS. 7C and 7D are respectively forward and port-side profile views of the VTOL UAS of FIG. 7A in a winged-flight configuration.
Figure 7D:
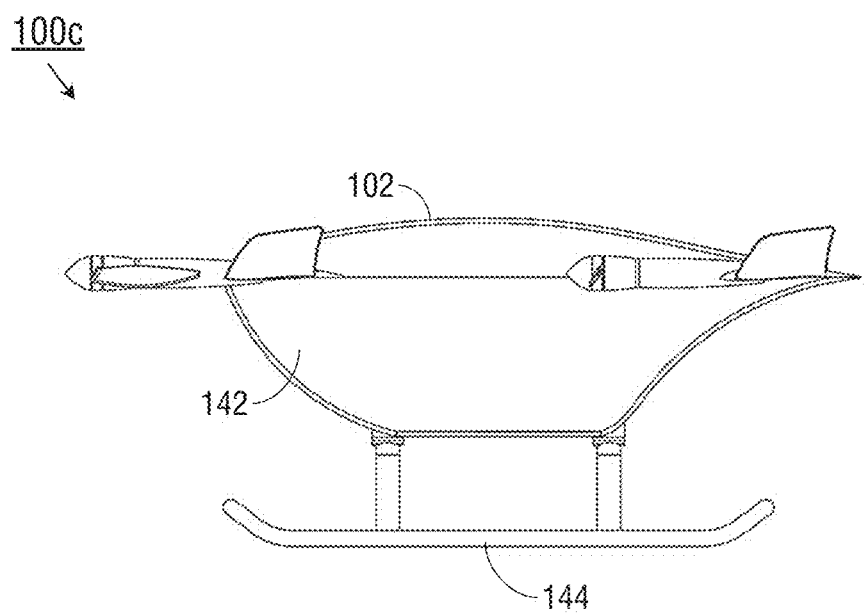

Referring in particular to FIG. 3, the VTOL UAS 100 may include an onboard control system 136 (e.g., disposed within the fuselage 102) including one or more control processors and configured for adjusting the pitch speeds of the forward and aft rotors 108, 114 and articulating (134b, FIG. 2B) the forward and aft wings 106, 112 between the powered-lift configuration shown by FIG. 1 and the winged-flight configuration shown by, e.g., FIG. 4. The control system 136 may include attitude sensors (138; e.g., accelerometer, gyrometer) for monitoring the rotational orientation of the VTOL UAS 100 and changes thereto. For example, the control system 136 may detect and respond to, based on the determined rotational orientation, a control or motor failure, as shown by FIGS. 6A and 6B. The control system 136 may further adjust the control surfaces 120 of the forward and aft wings 106, 112.

Referring now to FIG. 4, the VTOL UAS 100a may be implemented and may function similarly to the VTOL UAS 100 of FIG. 1, except that the VTOL UAS 100a may ascend vertically (e.g., substantially parallel to the yaw axis 124) in a powered-lift configuration (as shown by, e.g., FIG. 1) and transition inflight to a winged-flight configuration for forward flight operations. For example, the control system (136, FIG. 3) may articulate (134b, FIG. 2B) the forward wings 106 and aft wings 112 from the powered-lift orientation shown by FIG. 1 to a lowest-drag position (e.g., substantially parallel to the direction of flight and to the roll axis 126). The length of each forward and aft nacelle (104, 110) may extend the CG of each individual forward and aft rotor (108, 114) forward by the radial distance (134a, FIG. 2A) of the rotor assembly to a point of rotation along the MAC (to which the forward and aft nacelles 104, 110 may be aligned), shifting the CG of the VTOL UAS 100a forward and preserving stable flight characteristics throughout the transition from powered-lift to winged-flight configurations. As the forward and aft rotors (108, 114), nacelles (104, 110), and wings (106, 112) pivot forward in unison (e.g., around a rotational axis parallel to the pitch axis (128) of the VTOL UAS 100a), the forward and aft wings 106, 112 (as well as the control surfaces 120 and fences 122 of each wing) remain aerodynamically active, within the path of the airflow induced by the aft rotors 114. For example, the combination of wing tilt (e.g., when the forward and aft wings 106, 112 are in the lowest-drag position) and control-surface deflection (via the control surfaces 120 and/or wing fences 122 of forward and aft wings 106, 110) may provide exceptionally high control authority while the VTOL UAS 100a is operating under environmental conditions prohibitive of flight via multi-rotor helicopters and multicopters. The articulation (134b) of the forward and aft wings 106, 112 facilitates the necessary shift forward of the CG of the VTOL UAS 100a (as shown by, e.g., FIG. 2A) forward from a powered-lift position to a winged-flight position optimal for fixed-wing flight.

Figure 5A:
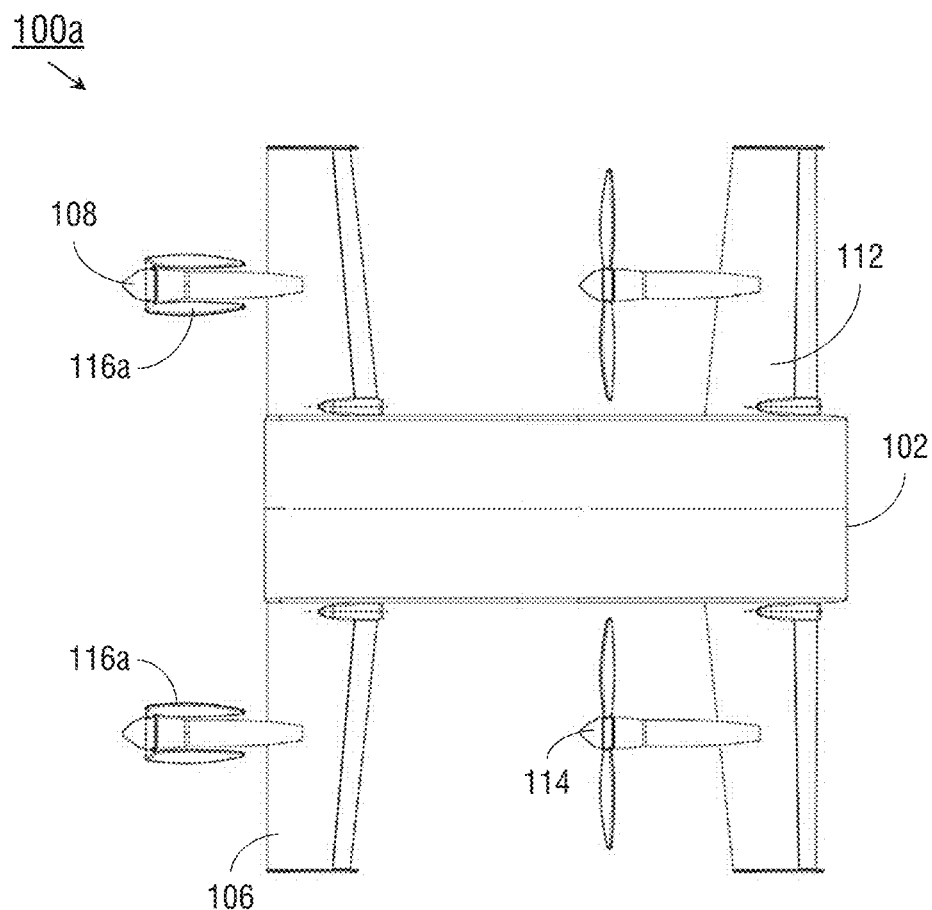
FIGS. 5A and 5B are respectively overhead and port-side profile views of the VTOL UAS of FIG. 4.
Figure 5B:
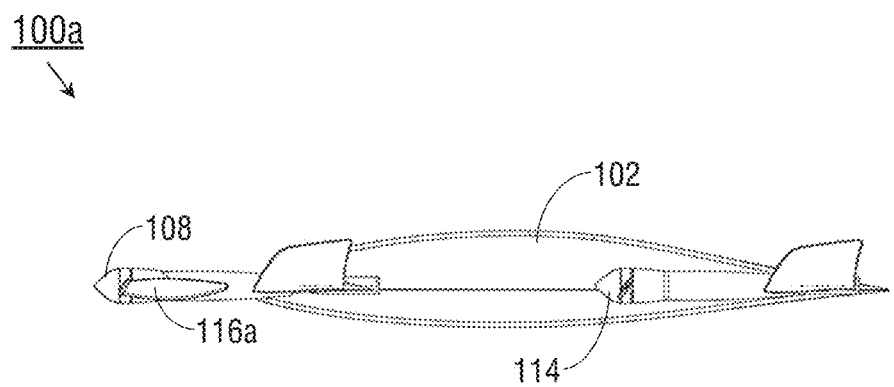

Referring also to FIGS. 5A and 5B, the aft rotors 114 of the VTOL UAS 100a may achieve the reduced lift requirement of the powered-lift configuration shown by, e.g., FIG. 1 via a pitch speed significantly greater than the optimal speed required to generate the required lift at minimum wattage. Once the VTOL UAS 100a has transitioned from the powered-lift configuration to the winged-flight configuration, the forward blades (116, FIG. 1) of the forward rotors 108 may fold into a streamlined position (116a) for forward flight. In the winged-flight configuration, the aft rotors 114 may utilize their greater pitch-speed capabilities and function as primary thrust rotors (rather than as lift rotors, e.g., in the powered-lift configuration). The folded forward rotor blades (116a) may be secured in a controllably alterable position for providing control about one or more axes (FIG. 1; yaw axis 124, roll axis 126, pitch axis 128) of the VTOL UAS 100a. For example, the folded forward rotor blades (116a) may continue to function as feathered rotor blades (e.g., rotating parallel to the airflow over the fuselage 102 and forward/aft wings 106, 112) in the winged-flight configuration.

Referring now to FIGS. 6A and 6B, the VTOL UAS 100b may be implemented and may function similarly to the VTOL UAS 100/100a of, e.g., FIGS. 1 and 4, except that the VTOL UAS 100b may detect, and respond to, failure conditions while transitioning from the winged-flight to the powered-lift configuration (or while already in the powered-lift configuration). For example, referring in particular to FIG. 6A, the VTOL UAS 100b (in the powered-lift configuration) may experience a control or component failure, e.g., a failure of the port forward rotor 108a (mounted at the end of the port forward nacelle 104a). The rotor failure may result in an imbalance of lift power detectable by the onboard attitude sensors (138, FIG. 3) as a rolling moment (140) relative to the roll axis 126 of the VTOL UAS 100b. If the detected rolling moment 140 is of sufficient magnitude (e.g., exceeds a predetermined threshold), the control system 136 may interpret the rolling moment 140 as a rotor failure. The control system 136 may respond to the detection of certain failure conditions (e.g., the failure of the port forward rotor 108a or a failure of a wing pivot mechanism) by transitioning the VTOL UAS 100b to the winged-flight configuration shown by FIG. 6B. Once in the winged-flight configuration, the VTOL UAS 100b may execute a return to a point of safe recovery under the power of the winged-flight thrust motors, i.e., the aft rotors (114, FIG. 5). A single aft rotor 114 may provide sufficient thrust to guide the VTOL UAS 100b to an emergency landing or recovery point.

Referring generally to FIGS. 7A through 7D, a VTOL UAS 100c may be implemented and may function similarly to the VTOL UAS 100/100a of FIGS. 1 and 4, except that the fuselage 102 of the VTOL UAS 100c may include a ventral exterior shell (142) enclosing one or more cargo compartments. The exterior shell 142 may include ventral landing skids 144 removably attached thereto. The landing skids 144 may contact the ground during vertical take-off and landing operations, protecting the fuselage 102, its internal components, and any payload contained within the exterior shell 142 therefrom. In some embodiments, the exterior shell 142 may sufficiently expand the payload capacity of the fuselage 102 such that the VTOL UAS 100c may transport cargo equivalent to a cube of edge 30 cm (0.27 m3) while maintaining a low-drag profile. The VTOL UAS 100c may transition normally from the powered-lift configuration shown by FIGS. 7A and 7B to the winged-flight configuration shown by FIGS. 7C and 7D.

We claim:

1. A variable-configuration vertical take-off and landing (VTOL) unmanned aircraft system (UAS), comprising:
   a fuselage to which a forward wing assembly and an aft wing assembly are pivotably mounted, the forward wing assembly comprising one or more of a forward wing and a forward nacelle, each forward nacelle including a forward rotor, the aft wing assembly comprising one or more of an aft wing and an aft nacelle, each aft nacelle including an aft rotor;
   a control system configured to:
   adjust one or more of a first pitch speed of the at least one forward rotor and a second pitch speed of the at least one aft rotor;
   transition the UAS between a powered-lift configuration and a winged-flight configuration by inducing a shift in a center of gravity (CG) associated with the UAS;
   determine a failure condition based on a determined rotational orientation of the UAS; and
   transition the UAS from the powered-lift configuration to the winged-flight configuration in response to the determined failure condition
   and
   at least one attitude sensor coupled to the fuselage and the control system, the attitude sensor configured to determine the rotational orientation of the UAS.

2. The variable-configuration VTOL UAS of claim 1, wherein:
   each forward rotor comprises a plurality of forward blades;
   and
   the control system is configured to transition the UAS between the powered-lift configuration and the winged-flight configuration by articulating one or more of the forward wing assembly, the aft wing assembly, and the plurality of forward blades.

3. The variable-configuration VTOL UAS of claim 2, wherein the control system is configured to transition the UAS between the powered-lift configuration and the winged-flight configuration by articulating the plurality of forward blades between a first blade position substantially perpendicular to the one or more forward nacelles and a second blade position substantially parallel to the one or more forward nacelles.

4. The variable-configuration VTOL UAS of claim 1, wherein the control system is configured to transition the UAS between the powered-lift configuration and the winged-flight configuration by articulating one or more of the forward wing assembly and the aft wing assembly between a first wing position substantially perpendicular to a roll axis of the UAS and a second wing position substantially parallel to the roll axis.

5. The variable-configuration VTOL UAS of claim 1, wherein:
   the one or more forward wings include at least a forward port wing and a forward starboard wing;
   the one or more aft wings include at least an aft port wing and an aft starboard wing;
   the one or more forward nacelles includes one or more of a forward port nacelle fixed to the forward port wing and a forward starboard nacelle fixed to the forward starboard wing;
   and
   the one or more aft nacelles includes one or more of an aft port nacelle fixed to the aft port wing and an aft starboard nacelle fixed to the aft starboard wing.

6. The variable-configuration VTOL UAS of claim 5, wherein:
   one or more of the forward port wing, the forward starboard wing, the aft port wing, and the aft starboard wing terminates in a wing fence.

7. The variable-configuration VTOL UAS of claim 5, wherein:
   each of the forward port wing and the forward starboard wing is a forward swept wing; and
   each of the aft port wing and the aft starboard wing is a swept-back wing.

8. The variable-configuration VTOL UAS of claim 1, wherein:
   the one or more forward nacelles are aligned with one or more mean aerodynamic chords (MAC) of the forward wing assembly;
   and the one or more aft nacelles are aligned with one or more MAC of the aft wing assembly.

9. The variable-configuration VTOL UAS of claim 1, further comprising:
   at least one exterior shell removably coupled to the fuselage, the exterior shell enclosing at least one cargo compartment; and
   at least one landing skid coupled to the exterior shell.

10. The variable-configuration VTOL UAS of claim 1, wherein the control system is configured to transition the UAS between the powered-lift configuration and the winged-flight configuration based on the determined rotational orientation.

11. The variable-configuration VTOL UAS of claim 1, wherein the fuselage is configured as a low aspect ratio wing.

12. The variable-configuration VTOL UAS of claim 3, wherein the forward blades are feathered blades configured for rotation when in the second blade position.

* * * * *